United States Patent
Cao

(10) Patent No.: US 11,641,257 B2
(45) Date of Patent: May 2, 2023

(54) ELECTRONIC DEVICE, WIRELESS COMMUNICATION METHOD, AND COMPUTER-READABLE MEDIUM

(71) Applicant: Sony Group Corporation, Tokyo (JP)

(72) Inventor: Jianfei Cao, Beijing (CN)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/868,782

(22) Filed: Jul. 20, 2022

(65) Prior Publication Data

US 2022/0376862 A1    Nov. 24, 2022

Related U.S. Application Data

(63) Continuation of application No. 16/638,154, filed as application No. PCT/CN2017/109691 on Nov. 7, 2017, now Pat. No. 11,451,352.

(51) Int. Cl.
| | |
|---|---|
| *H04B 7/02* | (2018.01) |
| *H04L 5/00* | (2006.01) |
| *H04B 7/0456* | (2017.01) |
| *H04B 7/06* | (2006.01) |

(52) U.S. Cl.
CPC ......... *H04L 5/0048* (2013.01); *H04B 7/0456* (2013.01); *H04B 7/0617* (2013.01); *H04B 7/0626* (2013.01); *H04B 7/0639* (2013.01)

(58) Field of Classification Search
CPC ... H04L 5/0048; H04B 7/0456; H04B 7/0617; H04B 7/0626; H04B 7/0639
USPC ......... 370/329, 328, 310; 375/219, 295, 316
See application file for complete search history.

(56) References Cited

U.S. PATENT DOCUMENTS

| | | | |
|---|---|---|---|
| 2009/0041151 A1 | 2/2009 | Khan et al. | |
| 2012/0250742 A1 | 10/2012 | Tiirola et al. | |
| 2013/0039319 A1 | 2/2013 | Shi et al. | |
| 2015/0215015 A1 | 7/2015 | Chen et al. | |
| 2020/0044801 A1* | 2/2020 | Wang | H04L 5/0051 |
| 2020/0244335 A1* | 7/2020 | Nilsson | H04B 7/0452 |

FOREIGN PATENT DOCUMENTS

| | | |
|---|---|---|
| CN | 102064924 A | 5/2011 |
| CN | 103312393 A | 9/2013 |
| CN | 106160952 A | 11/2016 |
| CN | 106301490 A | 1/2017 |

(Continued)

OTHER PUBLICATIONS

International Search Report and Written Opinion dated Jun. 25, 2018 for PCT/CN2017/109691 filed on Nov. 7, 2017, 8 pages.

(Continued)

*Primary Examiner* — Zewdu A Kassa
(74) *Attorney, Agent, or Firm* — Xsensus LLP

(57) ABSTRACT

The present disclosure relates to an electronic device, a wireless communication method, and a computer-readable medium. According to one embodiment, provided is an electronic device comprising a processing circuit and used for a user equipment side; the processing circuit is configured to control to transmit a non-precoded first uplink reference signal, receive feedback by a base station regarding the first uplink reference signal, and sending, on the basis of said feedback, a pre-coded second uplink reference signal.

13 Claims, 17 Drawing Sheets

(56) References Cited

FOREIGN PATENT DOCUMENTS

| CN | 106941368 A | 7/2017 |
|---|---|---|
| JP | 2008104193 A | 5/2008 |
| JP | 2012520636 A | 9/2012 |
| JP | 2017532859 A | 11/2017 |
| RU | 2496243 C2 | 10/2013 |
| WO | 2017/027055 A1 | 2/2017 |

OTHER PUBLICATIONS

Extended European search report dated Aug. 12, 2020, in corresponding European patent Application No. 17931537.9, 14 pages.
Office Action dated Dec. 18, 2020, in corresponding Russian patent Application No. 2020112381/07, 12 pages.
"Consideration on beam management", CATT, 3GPP TSG RAN WG1 Meeting 90bis R1-1717812, Oct. 9-13, 2017, URL:https://www.3gpp.org/ftp/TSG_RAN/WG1_RL1/TSGR1_90b/Docs/R1-1717812.zip.
"Updated evaluation of SRS enhancements", CMCC, 3GPP TSG RAN WG1 Meeting #81 R1-153034, May 25-29, 2015, <URL:https://www.3gpp.org/ftp/TSG_RAN/WG1_RL1/TSGR1_81/Docs/R1-153034.zip>.
Remaining Issues on non-codebook Based UL Transmission, 3GPP TSG RAN WG1 Meeting NR#3 R1-1716286, Sep. 18-21, 2017, <URL:https://www.3gpp.org/ftp/TSG_RAN/WG1_RL1/TSGR1_AH/NR_AH_1709/Docs/R1-1716286.zip>.
"Discussion on codebook based transmission for UL", LG Electronics, 3GPP TSG RAN WG1 Meeting#88bis R1-1704873, Apr. 3-7, 2017, <URL:https://www.3gpp.org/ftp/TSG_RAN/WG1_RL1/TSGR1_88b/Docs/R1-1704873.zip>.
"Discussion on SRS Design for NR", ZTE, ZTE Microelectronics, TSG RAN WG1 Meeting #88bis R1-1704414, Apr. 3-7, 2017, <URL:https://www.3gpp.org/ftp/TSG_RAN/WG1_RL1/TSGR1_88b/Docs/R1-1704414.zip>.
"Views on SRS design", Sony, 3GPP TSG RAN WG1 #88bis R1-1705210, Apr. 3-7, 2017, <URL:https://www.3gpp.org/ftp/TSG_RAN/WG1_RL1/TSGR1_88b/Docs/R1-1705210.zip>.
Huawei, HiSilicon, Codebook based transmission for UL MIMO[online], 3GPP TSG RAN WG1 Meeting #89 R1/1709206, 2017, May 16, 2016 Upload, Internet <URL:http://www.3gpp.org/ftp/tsg_ran/WG1_RL1/TSGR1_89/Docs/R1 / 1709206.zip >.
Huawei, HiSilicon, UL codebook design in NR[online], 3GPP TSG RAN WG1 Meeting #88 R1 / 1701686, 2017, Aug. 25, 2016 Upload, Internet <URL:http://www.3gpp.org/ftp/tsg_ran/WG1_RL1/TSGR1_88/Docs/R1 / 1701686.zip>.
Huawei, HiSilicon, Uplink control channel enhancements for reduced space CSI feedback[online], 3GPP TSG RAN WG1 Meeting #86 R1 / 167134, 2016, Aug. 12, 2016 Upload, Internet< URL: http://www.3gpp.org/ftp/tsg_ran/WG1_RL1/TSGR1_1141 /Docs/R1 /167134.zip>.
Catt, R1-1710057, Considerations on UL beam management, 3GPP TSG RAN WG1 #AH, 3GPP (server publication date: Jun. 27, 2017).
Huawei et al., R1-1706938, UL SRS design for beam management, CSI acquisition, 3GPP TSG RAN WG1 #89, 3GPP (server publication date: May 19, 2017).
LG Electronics, R1-1609250, Views on NR UL MIMO, 3GPP TSG RAN WG1 #86bis, 3GPP (server publication date: Oct. 10, 2016).

* cited by examiner

ELECTRONIC DEVICE, WIRELESS COMMUNICATION METHOD, AND COMPUTER-READABLE MEDIUM

CROSS-REFERENCE TO RELATED APPLICATIONS

The present application is a continuation of U.S. application Ser. No. 16/638,154, filed Feb. 11, 2020, which is based on PCT filing PCT/CN2017/109691, filed Nov. 7, 2017, the entire contents of which are incorporated herein by reference.

FIELD OF THE INVENTION

The present disclosure relates generally to the field of wireless communication, and more particularly, to an electronic device and wireless communication method for user equipment side, an electronic device and wireless communication method for base station side, and a computer-readable medium.

BACKGROUND OF THE INVENTION

With the increase in the frequency band used by wireless communication, a wireless channel will undergo larger negative influences such as a path loss, an atmospheric absorption loss and the like. To solve for example a problem of a high frequency band channel, 3GPP (Third Generation Partnership Project) introduces a large-scale antenna (Massive MIMO) technique, i.e., provides a large number of antenna elements at a base station or a User Equipment (UE) to perform beamforming so as to make up an attenuation loss in the high frequency band channel.

Although a size of a UE is relatively small, it is still possible to provide a plurality of antenna elements. However, considering that the cost of a radio frequency device is relatively high, transceiver units (TXRU) generally will not be configured in one-to-one proportion to antenna elements. Considering proportions between different TXRUs and antenna elements, there is a compromise between analog beamforming and digital beamforming. In case of more TXRUs, the capacity of digital beamforming that can be performed is stronger, but correspondingly the capacity of radio frequency beamforming is weaker; and in case of more antenna elements, the capacity of radio frequency beamforming is stronger, but correspondingly the capacity of digital beamforming is weaker.

SUMMARY OF THE INVENTION

A brief summary of embodiments of the present invention is given below to provide a basic understanding of some aspects of the present invention. It should be understood that the following summary is not an exhaustive summary of the present invention. It does not intend to define a key or important part of the present invention, nor does it intend to limit the scope of the present invention. The object of the summary is only to briefly present some concepts, which serves as a preamble of the detailed description that follows.

According to an embodiment, there is provided an electronic device for user equipment side, comprising processing circuitry. The processing circuitry is configured to perform control to: transmit a first uplink reference signal which is non-precoded; receive a feedback from a base station with respect to the first uplink reference signal; and transmit, based on the feedback, a second uplink reference signal which is precoded.

According to another embodiment, there is provided a wireless communication method for user equipment side, comprising: transmitting a first uplink reference signal which is non-precoded; receiving a feedback from a base station with respect to the first uplink reference signal; and transmitting, based on the feedback, a second uplink reference signal which is precoded.

According to still another embodiment, there is provided an electronic device for base station side, comprising processing circuitry. The processing circuitry is configured to perform control to: receive, from a user equipment, a first uplink reference signal which is non-precoded; transmit a feedback to the user equipment based on the first uplink reference signal; and receive, from the user equipment, a second uplink reference signal which is precoded and which is transmitted based on the feedback.

According to yet another embodiment, there is provided a wireless communication method for base station side, comprising: receiving, from a user equipment, a first uplink reference signal which is non-precoded; transmitting a feedback to the user equipment, based on the first uplink reference signal; and receiving, from the user equipment, a second uplink reference signal which is precoded and which is transmitted based on the feedback.

According to another embodiment, there is provided an electronic device for user equipment side, comprising processing circuitry. The processing circuitry is configured to perform control to: transmit a precoded first uplink reference signal by using two or more uplink reference signal resources; receive a feedback from a base station with respect to the first uplink reference signal; and transmit, based on the feedback, a precoded second uplink reference signal.

According to still another embodiment, there is provided a wireless communication method for user equipment side, comprising: transmitting a precoded first uplink reference signal by using two or more uplink reference signal resources; receiving a feedback from a base station with respect to the first uplink reference signal; and transmitting, based on the feedback, a precoded second uplink reference signal.

According to yet another embodiment, there is provided an electronic device for base station side, comprising processing circuitry. The processing circuitry is configured to perform control to: receive, from a user equipment, a precoded first uplink reference signal which is transmitted using two or more uplink reference signal resources; transmit a feedback to the user equipment based on the first uplink reference signal; and receive a precoded second uplink reference signal which is transmitted by the user equipment based on the feedback.

According to another embodiment, there is provided a wireless communication method for base station side, comprising: receiving, from a user equipment, a precoded first uplink reference signal which is transmitted using two or more uplink reference signal resources; transmitting a feedback to the user equipment based on the first uplink reference signal; and receiving a precoded second uplink reference signal which is transmitted by the user equipment based on the feedback.

Embodiments of the present invention further include a computer-readable medium comprising executable instructions that, when executed by an information processing apparatus, cause the information processing apparatus to perform the methods according to the above-mentioned embodiments.

Embodiments of the present invention are capable of improving the accuracy of Uplink Channel state Information (CSI) and lowering system overhead.

BRIEF DESCRIPTION OF THE DRAWINGS

The present invention could be better understood with reference to the description given below in combination with the appended drawings, wherein throughout the appended drawings, identical or like reference signs are used to represent identical or like components. The appended drawings together with the detailed description below are included in the specification and form a part of the specification, and are used to further describe preferred embodiments of the present invention and explain the principles and advantages of the present invention by way of examples. In the appended drawings.

EMBODIMENTS OF THE INVENTION

Hereinafter, embodiments of the present invention will be described with reference to the appended drawings. Elements and features described in one figure or one embodiment of the present invention may be combined with elements and features described in one or more other figures or embodiments. It should be noted that, for the sake of clarity, representation and description of components and processing known to those ordinarily skilled which are irrelevant to the present invention are omitted in the appended drawings and the description.

Figure 1:
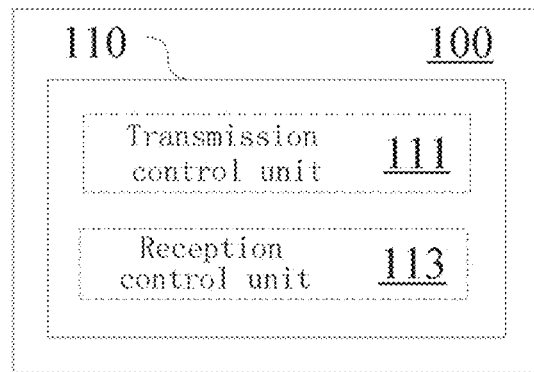
FIG. 1 is a block diagram showing a configuration example of an electronic device for user equipment side according to an embodiment of the present invention.

As shown in FIG. 1, an electronic device 100 for user equipment side according to the present embodiment comprises processing circuitry 110. The processing circuitry 110 may, for example, be implemented as a specific chip, chipset or Central Processing Unit (CPU) or the like.

The processing circuitry 110 comprises a transmission control unit 111 and a reception control unit 113. It should be noted that, although the transmission control unit 111 and the reception control unit 113 are shown in the form of functional blocks in the accompanying drawings, it should be understood that the functions of these units may also be implemented by the processing circuitry 110 as a whole but not necessarily implemented by discrete, actual components in the processing circuitry 110. In addition, although the processing circuitry 110 is shown as one block in the figure, the electronic device 100 may comprise a plurality of processing circuitries, and can distribute the functions of the transmission control unit 111 and the reception control unit 113 to the plurality of processing circuitries so as to implement these functions through cooperative operations of the plurality of processing circuitries.

The transmission control unit 111 is configured to perform control to transmit a first uplink reference signal which is non-precoded.

The reception control unit 113 is configured to perform control to receive a feedback from a base station with respect to the first uplink reference signal.

According to an embodiment, the feedback from the base station with respect to the first uplink reference signal may include a precoding matrix indication determined by the base station based on the first uplink reference signal.

The transmission control unit 111 is further configured to perform control to transmit, based on the feedback, a second uplink reference signal which is precoded.

According to an embodiment, the reception control unit 113 may further be configured to perform control to receive uplink channel state information determined by the base station based on the second uplink reference signal. As an example but not a limitation, the uplink channel state information may, for example, include an uplink precoding matrix index and a rank index.

In addition, according to an embodiment, the transmission control unit 111 is configured to perform control to transmit the first uplink reference signal with a first period, and to transmit the second uplink reference signal with a second period shorter than the first period.

Figure 11:
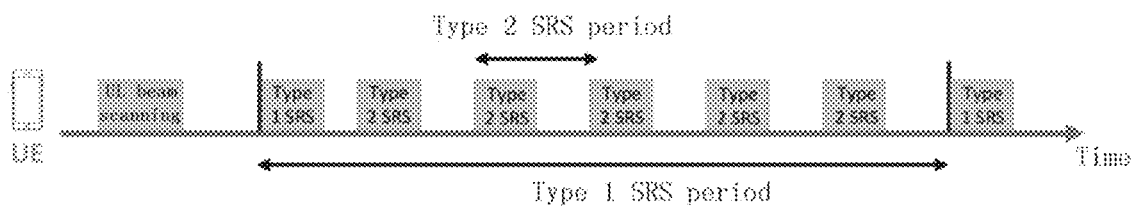
FIG. 11 is a schematic view for illustrating a transmission period of an uplink Sounding Reference signal (SRS)

In the example as shown in FIG. 11, a Type 1 SRS (a first class of uplink reference signal) corresponds to the above-mentioned first uplink reference signal, and a Type 2 SRS (a second class of uplink reference signal) corresponds to the above-mentioned second uplink reference signal. As shown in FIG. 11, the Type 1 SRS is transmitted with a Type 1 SRS period, and within each Type 1 SRS period, a plurality of Type 2 SRSs may be transmitted in a Type 2 SRS period.

Further, before the base station acquires uplink CSI, it is required to establish, between the base station and a UE, an appropriate Beam Pair Link (BPL) or in other words transmitting/receiving beam (Tx-Rx Beam), i.e., an uplink transmitting beam at user side and an uplink receiving beam at base station side, as well as a downlink receiving beam at user side and a downlink transmitting beam at base station side. The base station may know a suitable receiving beam at the base station and a transmitting beam from the UE by measuring an uplink reference signal, and notify the UE of its transmitting beam through a downlink control channel, for example, may notify the UE of its transmitting beam through a downlink control channel on a low frequency band carrier of another base station in dual connection before a downlink beam pair link is established. Accordingly, the user may know a suitable transmitting beam at the base station and a receiving beam at the UE by measuring a downlink reference signal, and notify the base station of its transmitting beam through an uplink control channel, for example, may notify the base station of its transmitting beam through an uplink control channel on a low frequency band carrier of another base station in dual connection before an uplink beam pair link is established. The purpose of the process is causing the UE to know which beam shall be used to perform uplink transmission and downlink reception, and causing the base station to know which corresponding beam shall be used to perform uplink reception and downlink transmission.

Figure 2:
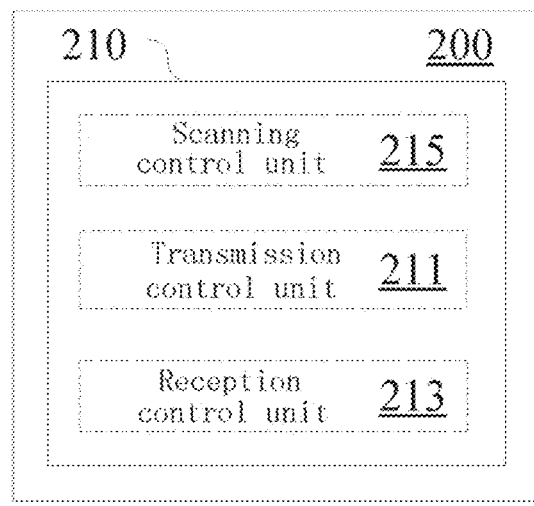
FIG. 2 is a block diagram showing a configuration example of an electronic device for user equipment side according to another embodiment of the present invention.

Accordingly, as shown in FIG. 2, an electronic device 200 for user equipment side according to an embodiment comprises a processing circuitry 210. The processing circuitry 210 comprises a transmission control unit 211, a reception control unit 213 and a scanning control unit 215.

The scanning control unit 215 is configured to control to perform beam scanning, and the transmission control unit 211 is configured to perform control to transmitting the first uplink reference signal on a beam determined by the beam scanning.

Hereinafter, we assume that a BPL whose beamforming gain is strong enough has been established between the base station and the UE. Subsequent CSI acquisition, i.e., transmitting an uplink reference signal by the UE and measuring the signal by the base station, is performed on the determined BPL. As an example, the UL beam scanning as shown in FIG. 11 corresponds to an uplink beam scanning process.

The uplink beam scanning process may, for example, include the following processes: a base station end (TRP, Transmission/Reception Point) performs measurement to determine an uplink transmitting beam of the UE or an uplink receiving beam of the base station end; the base station end performs measurement to select or change a receiving beam of the base station end; the base station end performs measurement to change an uplink transmitting beam of the UE.

Further, according to another embodiment, it is possible to perform transmission of the first uplink reference signal on a beam determined in an initial access phase.

In other words, the beam on which the first uplink reference signal is transmitted may be a beam determined through the UE performing uplink beam scanning, and may also be a coarse beam determined by the UE in an initial access phase. Compared with a fine beam, the coarse beam mentioned herein refers to the beam which has a relatively broad spatial directivity but a relatively small beamforming gain.

Next, an exemplary embodiment of acquiring uplink hybrid channel state information will be illustrated with reference to FIG. 12A through FIG. 12D.

Figure 12A:
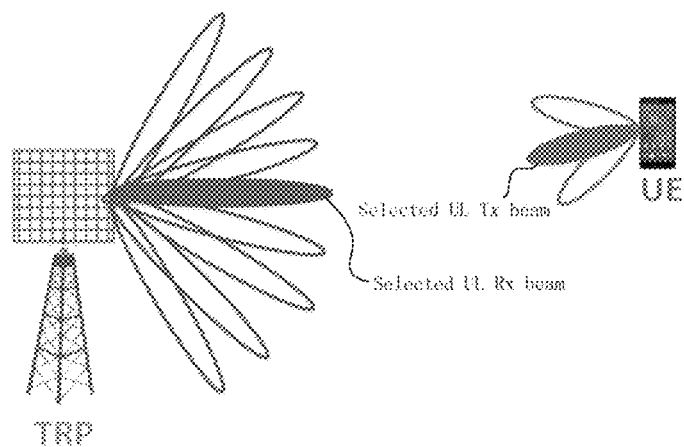
FIG. 12A through FIG. 12D are schematic views for illustrating uplink hybrid channel state information according to an exemplary embodiment.

First, as shown in FIG. 12A, a transmitting (Tx) beam of the UE and a receiving (Rx) beam of the base station (TRP) are determined based on beam scanning.

Figure 12B:
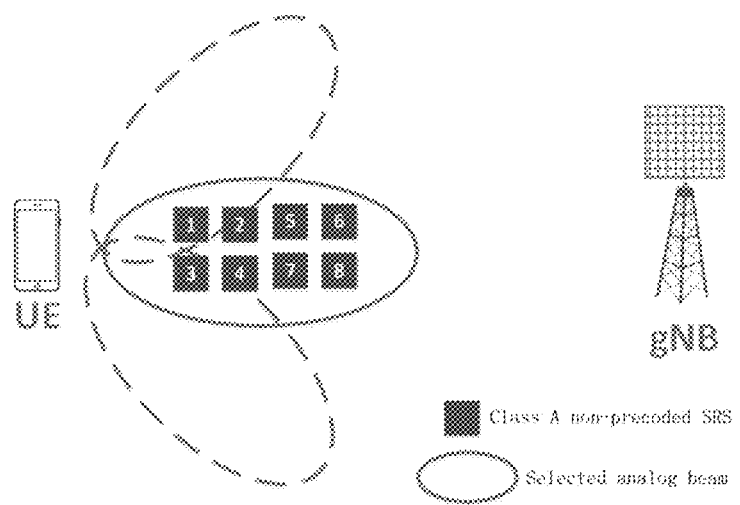

Next, as shown in FIG. 12B, the UE transmits non-precoded SRS signals (Class A non-precoded SRSs) on a beam which has been selected, and the base station calculates a partial precoding matrix indication (partial PMI, i.e., an index of codewords W1 in a first-level codebook representing a channel wideband long-time characteristic) through measurement, and feeds it back to the UE.

Figure 12C:
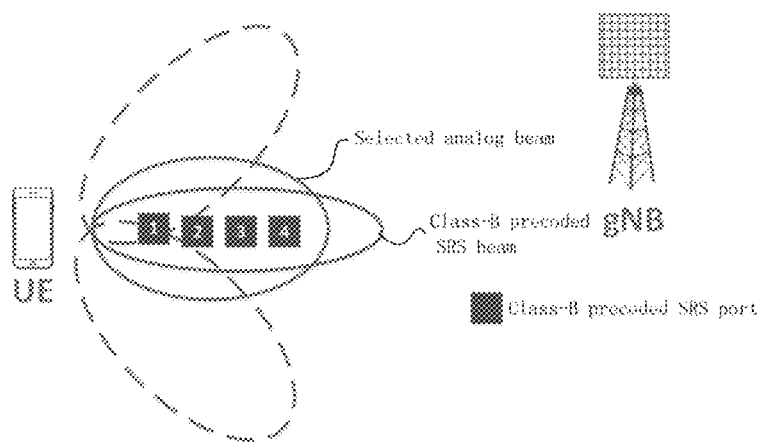

Then, as shown in FIG. 12C, the UE performs precoding on the SRSs through the precoding matrix W1 indicated by the partial PMI fed back from the base station and transmits the precoded SRSs, and the base station performs a feedback of codewords W2 in a second-level codebook representing a channel narrowband short-time characteristic by measuring the precoded SRSs to the UE such that it acquires uplink channel CSI.

Figure 12D:
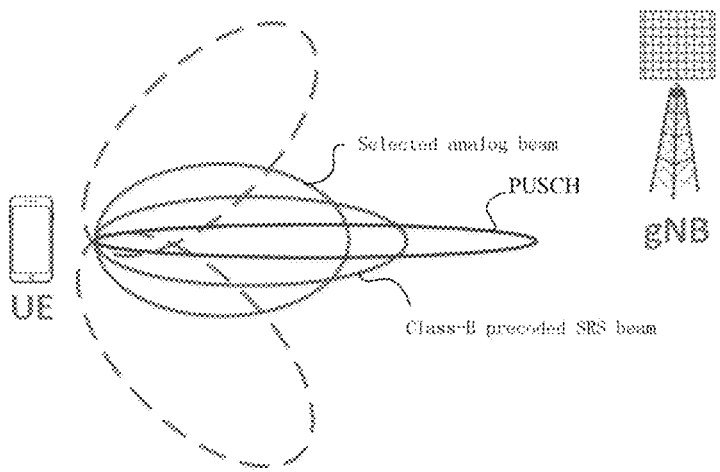

Finally, as shown in FIG. 12D, the UE precodes a data symbol on an uplink data channel PUSCH (Physical Uplink Shared Channel) according to a channel condition reflected by the uplink channel CSI so as to transmit uplink data. For example, the data is precoded through a precoding matrix W obtained from W1*W2.

It should be noted that, the specific details given in the above-mentioned example are only illustrative but not limiting.

In the above-mentioned exemplary process, upon determination of an uplink transmitting beam, the UE may transmit full-port Class A SRSs on the beam, and the Class A SRSs herein refer to non-precoded SRSs. That is, the number of TXRUs that the UE has or the number of ports of SRSs that have been configured is the number of ports of SRSs that are transmitted. The UE transmits, within corresponding SRS resources, all SRS ports which are non-precoded. In various examples of the present disclosure, precoding refers to digital, multi-antenna precoding.

In correspondence to the above-mentioned CSI measurement of Class A, CSI measurement of Class B may also be defined, which is performed based on a downlink precoded reference signal. Further, it is also possible to define long-period and wide-band channel CSI (referred to as a first class of CSI, obtained through measurement corresponding to the Type 1 SRS in FIG. 11) and short-period and sub-band CSI (referred to as a second class of CSI, measured corresponding to the Type 2 SRS in FIG. 11). The purpose of the first class of CSI is to collect a long-term characteristic of a channel in order to transmit a reference signal of the second class of CSI to perform precoding. The second class of CSI is short-period and sub-band CSI in order to obtain final CSI.

In order to enable the base station to receive an SRS signal with sufficient receiving power, in particular within a frequency range above 6 GHz, for example, the UE may perform transmission of concentrated power on the respective ports of SRSs.

Accordingly, according to an embodiment, the transmission control unit 111 may be configured to transmit the first uplink reference signal in a power boosting manner.

The power boosting manner may comprise concentrating power to a Resource Element (RE) carrying the first uplink reference signal in an Orthogonal Frequency Division Multiplexing (OFDM) Symbol containing the first uplink reference signal.

Alternatively, the power boosting manner may comprise transmitting only one uplink reference signal port in one orthogonal frequency division multiplexing symbol containing the first uplink reference signal.

Further, the power boosting manner may further comprise: in an orthogonal frequency division multiplexing symbol containing the first uplink reference signal, configuring zero power for a resource element which is not for an uplink reference signal.

Figure 13:
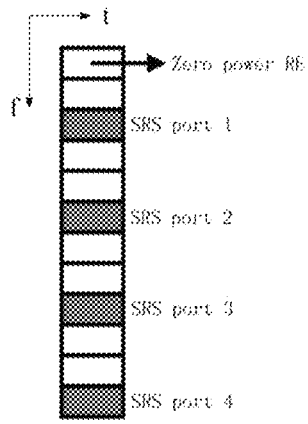
FIG. 13 is a schematic view for illustrating a power boosting manner according to an exemplary embodiment.

FIG. 13 is a schematic view showing an example of performing a power boosting operation on SRS ports. In FIG. 13, the vertical axis t represents time (i.e., OFDM symbol), and the longitudinal axis f represents frequency (i.e., subcarrier). As shown in the figure, in a certain OFDM symbol containing an SRS, the UE concentrates all power to an RE carrying the SRS, and zero power is configured at positions of REs not carrying the SRS.

Taking four SRS ports occupying one OFDM symbol as an example, a power boosting scheme may cause transmitting power of each SRS port to be increased to three times the original transmitting power.

Figure 14:
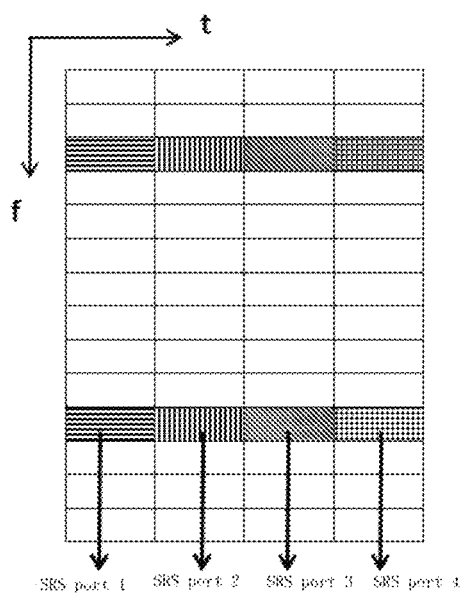
FIG. 14 is a schematic view for illustrating a power boosting manner according to another exemplary embodiment.

FIG. 14 is a schematic view showing a switch (SRS Port Switch) operation on SRS ports. In FIG. 14, the vertical axis t represents time (i.e., OFDM symbol), and the longitudinal axis f represents frequency (i.e., subcarrier). As shown in FIG. 14, only one SRS port is transmitted in a certain OFDM symbol containing an SRS, and another SRS port is transmitted in a next OFDM symbol containing an SRS. Briefly, the respective SRS ports are transmitted in turn, and one SRS port may occupy more REs to be transmitted and exclusively occupy uplink transmitting power in one OFDM symbol.

It should be noted that, the power boosting scheme may be used in combination in the port switch scheme, that is, one OFDM symbol only transmits one SRS port, and power of other REs in the symbol is set to zero, and the saved power may be provided for use by an RE occupied by the SRS port. The purpose of this is to enabling a non-precoded SRS signal transmitted by the UE to be received by the base station with sufficient power.

Further, for example, due to problems such as uplink path loss measurement and rate matching and the like, the UE may need to report, to the base station, whether the SRS ports use the power boosting scheme.

Accordingly, according to an embodiment, the transmission control unit 111 may be configured to perform control to report, to the base station, indication information regarding whether the power boosting manner is used.

Figure 15:
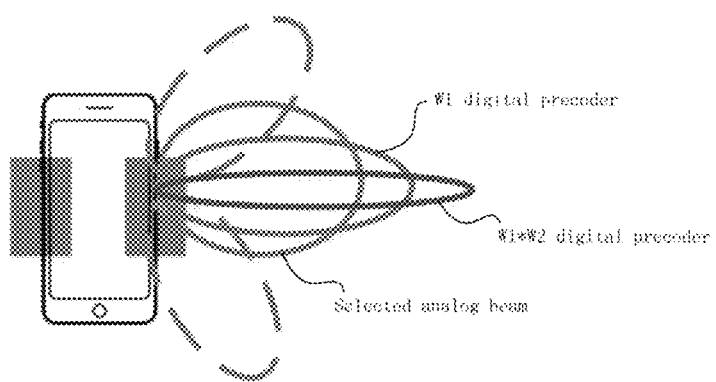
FIG. 15 is a schematic view for illustrating transmission of analog beams and digital precoding by a user equipment according to an exemplary embodiment.

Next, general description of the above-mentioned exemplary process will be further illustrated with reference to FIG. 15.

From the perspective of time, a transmission period of the Class A SRSs is longer, and its purpose is to cause the base station to know a general condition of an uplink channel of the UE. The time relationship is, for example, as shown in FIG. 11.

After measuring the Class A SRSs, the base station may know a precoding matrix which is relatively suitable for the UE, and notify the UE, for example, in the manner of uplink wordcodes W1. The general precoding codeword of the channel is W=W1\*W2, wherein the function of W2 is equivalent to selecting one codeword among M second-level codewords contained in W1.

The UE may deduce a relatively suitable precoding matrix from W1, and use the precoding matrix in a subsequent process to perform precoding on a Class B SRS, such that the SRS has a stronger beamforming gain, i.e., spatial directivity. Meanwhile, the number of Class B SRS ports is also significantly decreased in comparison with the number of the previous Class A SRS ports, thereby reducing reference signal overhead of the system.

Next, brief illustration with regard to calculation of precoding will be made.

The UE transmits an SRS which is non-precoded. The base station measures the SRS, and decomposes the whole channel, i.e., $H_{all}=h_{ver} \otimes h_{hor}$, where $h_{ver}$ and $h_{hor}$ represent channels of "vertical-dimension" and "horizontal-dimension" ports of the UE, respectively, and their Kronecker product represents the whole channel. It should be noted that, since an antenna panel of the UE moves and rotates along with a spatial position of the UE, the "vertical-dimension" and the "horizontal-dimension" do not necessarily refer to being vertical to the ground and horizontal to the ground in real sense, but are intended to represent that there is such a relationship among different SRS ports in one antenna panel of the UE that they are vertical to each other. Taking a vertical-dimension channel as an example, the base station needs to select one from among K vertical-dimension precoding matrixes contained in a codebook to perform vertical-dimension precoding on an SRS. The base station may calculate $|p_{ver}^{k}{}^{H} h_{ver}|^2$ where $p_{ver}^{k}$ is one in a k-th vertical-dimension precoding matrix, and a largest one may be selected as the precoding to be next used. This example decomposes the channel into a vertical dimension and a horizontal dimension and respectively feeds back precoding matrixes, but the present disclosure is not limited hereto. It is also possible to perform no channel decomposition, and the base station feeds back an indication of a precoding matrix representing the whole uplink channel to the UE.

The base station measures the precoded Class B SRSs, obtains an uplink Precoding Matrix Index (TPMI) and a Rank Index (TRI) through calculation and notifies them to the UE. The base station may inform, through UL Grant (uplink grant), the UE of a grade of a Modulation Coding Scheme (MCS) that shall be used. Alternatively, the base station may also notify UE of a Channel Quality Indication (CQI).

In the above-mentioned exemplary process, after a relatively fine beam pair link has been established through a beam scanning process between the base station and the UE, for example, if only Type 1 Class A SRSs have been configured for the UE through only high layer signaling such as RRC signaling, then the UE only transmits class A SRSs, and transmits data through the TPMI fed back by the base station. On the other hand, after a relatively coarse beam pair link has been established for example through only an initial access process between the base station and the UE, if the base station not only has configured Type 1 Class A SRSs for a UE but also has configured SRSs of Class B K=1 resources for the UE through high layer signaling such as RRC signaling, then the UE performs acquisition of hybrid uplink CSI through the above-mentioned flow.

Figure 16:
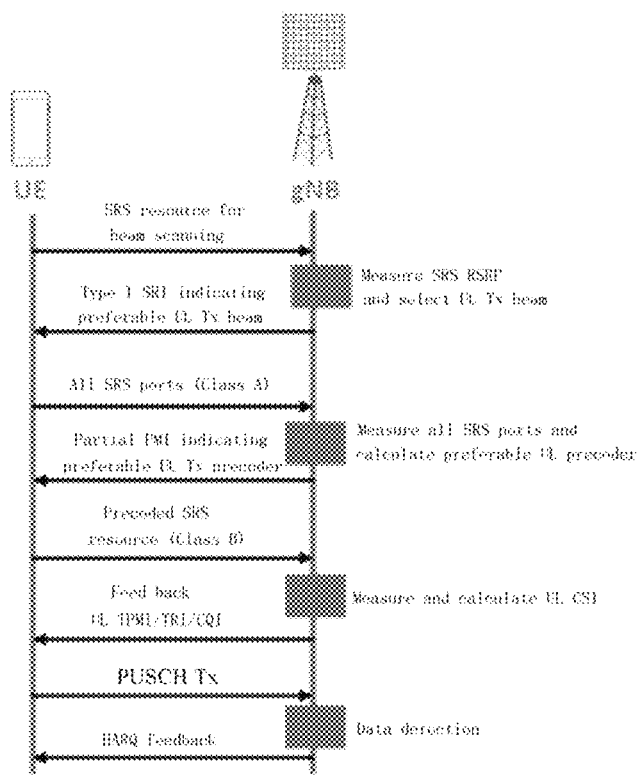
FIG. 16 shows a schematic view of signaling interaction for uplink hybrid channel state information according to an exemplary embodiment.

Next, an example of an acquiring process of channel state information will be illustrated in combination with FIG. 16.

First, the UE and the base station perform a beam scanning process, and the base station measures an SRS reference signal, performs selection of an uplink transmitting (UL Tx) beam, for example, selecting an uplink transmitting beam with the strongest receiving power (RSRP), and transmits a first SRS resource indication (Type I SRI) indicating the selected beam to the UE. Since all the uplink transmitting beams transmit SRSs carried by different resources, both the base station and the UE may recognize corresponding beams through resource indications of SRSs.

Next, the UE performs transmission through all the SRS ports, and the base station measures all the SRS ports and calculates a preferable UL precoder, and transmits a partial PMI indicating a preferable UL Tx precoder (W1) to the UE.

Next, the UE performs precoding on the SRSs according to the UL Tx precoder W1 fed back by the base station and transmits the precoded SRSs, and the base station performs measurement and calculates uplink channel state information (UL CSI) capable of indicating a finer precoding matrix W2, so as to feed back uplink TPMI, TRI and/or CQI to the UE.

Finally, the UE performs precoding on a data symbol using the precoder **W1\*W2** indicated by the base station so as to perform PUSCH transmission, and the base station performs data detection and performs Hybrid Automatic Repeat Request (HARQ) feedback.

In the foregoing description process of the electronic device for user equipment side according to the embodiment of the present invention, some processes and methods obviously have also been disclosed. Next, illustration with regard to a wireless communication method for user equipment side according to an embodiment of the present invention will be given without repeating the details having been described previously.

Figure 3:
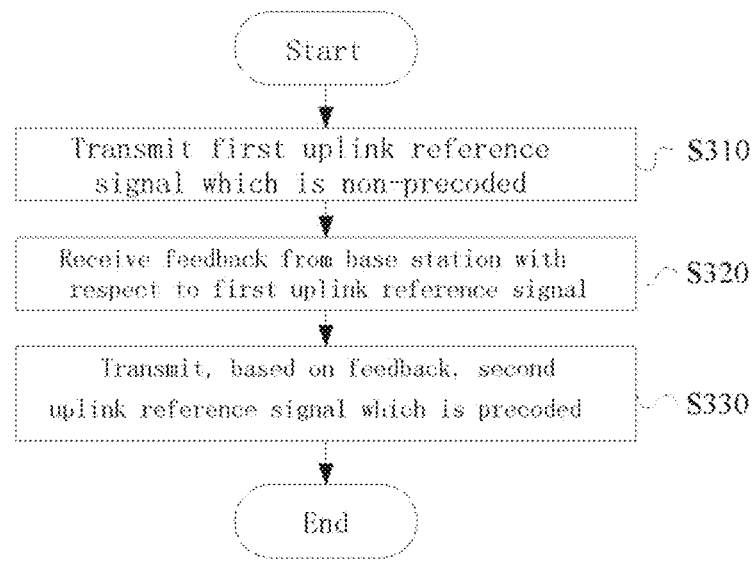
FIG. 3 is a flowchart showing a process example of a wireless communication method for user equipment side according to an embodiment of the present invention.

As shown in FIG. 3, according to an embodiment, a wireless communication method for user equipment side comprises the following steps:

S310 of transmitting a first uplink reference signal which is non-precoded;

S320 of receiving a feedback from a base station with respect to the first uplink reference signal; and S330 of transmitting, based on the feedback, a second uplink reference signal which is precoded.

Further, embodiments of the present invention further include an electronic device for base station side.

Figure 4:
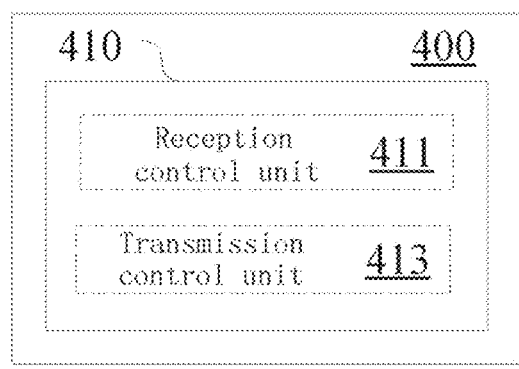
FIG. 4 is a block diagram showing a configuration example of an electronic device for base station side according to an embodiment of the present invention.

As shown in FIG. 4, an electronic device 400 for base station side according to an embodiment comprises processing circuitry 410. The processing circuitry 410 comprises a reception control unit 411 and a transmission control unit 413.

The reception control unit 411 is configured to perform control to receive, from a user equipment, a first uplink reference signal which is non-precoded.

The transmission control unit 413 is configured to perform control to transmit a feedback to the user equipment based on the first uplink reference signal.

The reception control unit 411 is further configured to perform control to receive, from the user equipment, a second uplink reference signal which is precoded and which is transmitted based on the feedback.

Figure 5:
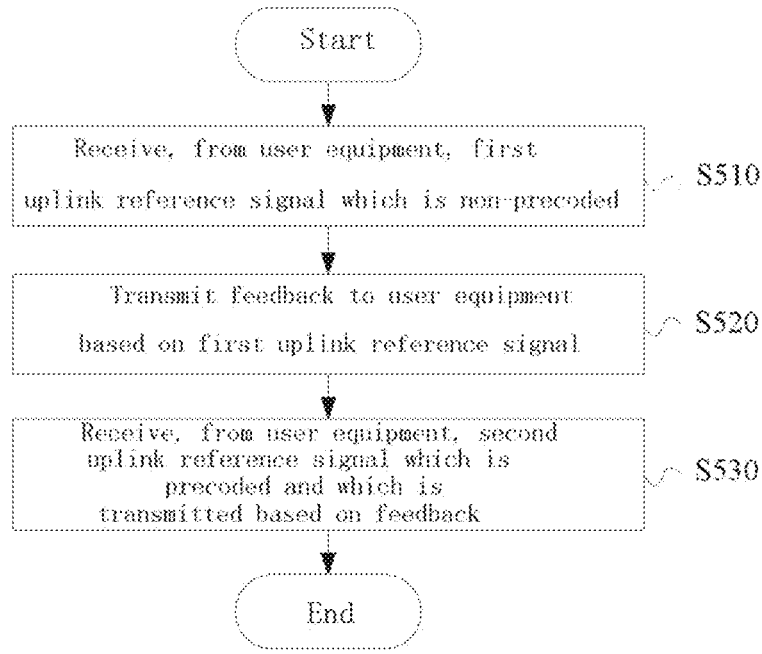
FIG. 5 is a flowchart showing a process example of a wireless communication method for base station side according to an embodiment of the present invention.

FIG. 5 shows a wireless communication method for base station side according to an embodiment, comprising the following steps:

S510 of receiving, from a user equipment, a first uplink reference signal which is non-precoded;

S520 of transmitting a feedback to the user equipment, based on the first uplink reference signal; and S530 of receiving, from the user equipment, a second uplink reference signal which is precoded and which is transmitted based on the feedback.

In the above-described embodiment according to a first aspect of the prevent invention, a hybrid CSI mechanism of Class A+K=1 Class B has been adopted, wherein Class A represents non-precoded SRSs, and K=1 Class B represents precoded SRSs for which the number of precoded SRS resources is 1.

According to an embodiment of another aspect of the present invention, there is provided a hybrid CSI mechanism of K>1 Class B+K=1 Class B, wherein K>1 Class B represents precoded SRSs for which the number of precoded SRS resources is larger than 1. Next, the embodiment of this aspect will be described.

An electronic device for user equipment side according to an embodiment of a second aspect of the present invention will be described still with reference to FIG. 1. An electronic device 100 according to the present embodiment comprises a processing circuitry 110. The processing circuitry 110 comprises a transmission control unit 111 and a reception control unit 113.

The transmission control unit 111 is configured to perform control to transmit a precoded first uplink reference signal by using two or more uplink reference signal resources.

The reception control unit 113 is configured to perform control to receive a feedback from a base station with respect to the first uplink reference signal.

According to an embodiment, the feedback may comprise indication information of a reference signal resource selected by the base station through measuring the above-mentioned two or more uplink reference signal resources. Alternatively, the feedback may comprise a channel quality indication of the base station with respect to each precoded uplink reference signal resource.

The transmission control unit 111 is further configured to perform control to transmit, based on the feedback, a precoded second uplink reference signal.

Similarly to the case as shown in FIG. 11, in an embodiment according to a second aspect of the present invention, the transmission control unit 111 may further be configured to perform control to transmit the first uplink reference signal with a first period, and to transmit the second uplink reference signal with a second period shorter than the first period.

According to an embodiment, the reception control unit 113 may further be configured to perform control to receive uplink channel state information determined by the base station based on the second uplink reference signal.

As an example, the uplink channel state information may comprise an uplink precoding matrix index, In the embodiment according to the second aspect, the UE may perform beam scanning in a similar way to the foregoing embodiment, and the base station notifies the UE of its uplink transmitting beam, for example, by feeding back SRI (SRS resource indication). Subsequently, the UE may transmit K>1 Class B SRS resources through precoding within a selected analog beam range.

In particular, the UE may determine a precoding matrix of K>1 precoded SRSs according to the determined uplink transmitting beam. For example, if the uplink beam determined by the UE covers a 40-degree space from 60 degrees to 100 degrees in a horizontal dimension, then the UE may select K=4 precoding matrixes to transmit in a horizontal space the precoded SRSs which respectively cover 60 degrees to 70 degrees, 70 degrees to 80 degrees, 80 degrees to 90 degrees and 90 degrees to 100 degrees. Those skilled in the art could understand that, digital precoding can also cause a radio wave to have a certain directivity, such that SRSs which cover different angles respectively can be transmitted through superposed use of different precoding matrixes and same analog beams.

Figure 6:
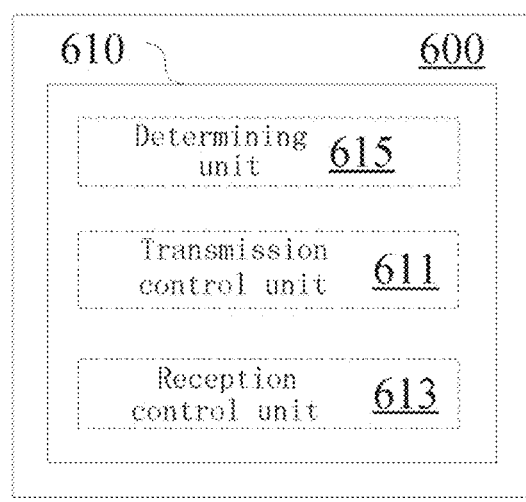
FIG. 6 is a block diagram showing a configuration example of an electronic device for user equipment side according to an embodiment of the present invention.

FIG. 6 shows a configuration example of an electronic device 600 for user equipment side according to another embodiment. The electronic device 600 comprises processing circuitry 610. The processing circuitry 610 comprises a determining unit 615, a transmission control unit 611 and a reception control unit 613. The transmission control unit 611 and the reception control unit 613 are configured similarly to the transmission control unit and the reception control unit described previously.

The determining unit 615 is configured to determine the number of uplink reference signal resources for the first uplink reference signal according to a spatial coverage range of a beam, wherein the beam may be determined through beam scanning or determined in an initial access phase.

Next, an exemplary manner of acquiring uplink hybrid channel state information will be illustrated with reference to FIG. 17A through FIG. 17D.

Figure 17A:
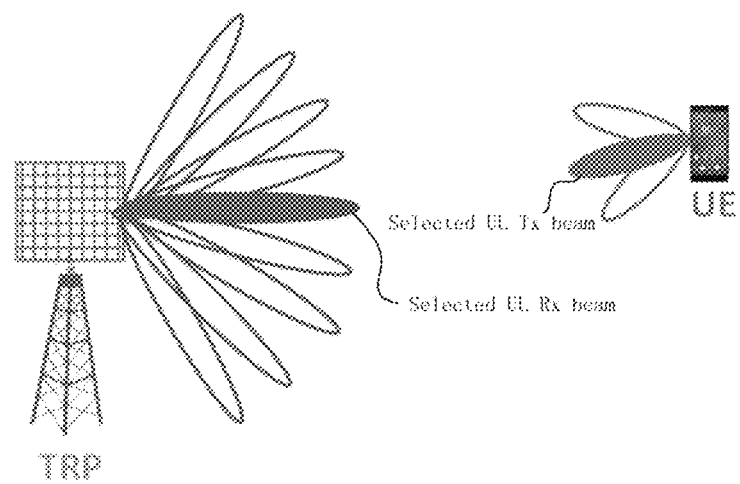
FIG. 17A through FIG. 17D are schematic views for illustrating uplink hybrid channel state information according to another exemplary embodiment.

As shown in FIG. 17A, first, a transmitting beam of the UE and a receiving beam of the base station are determined based on beam scanning.

Figure 17B:
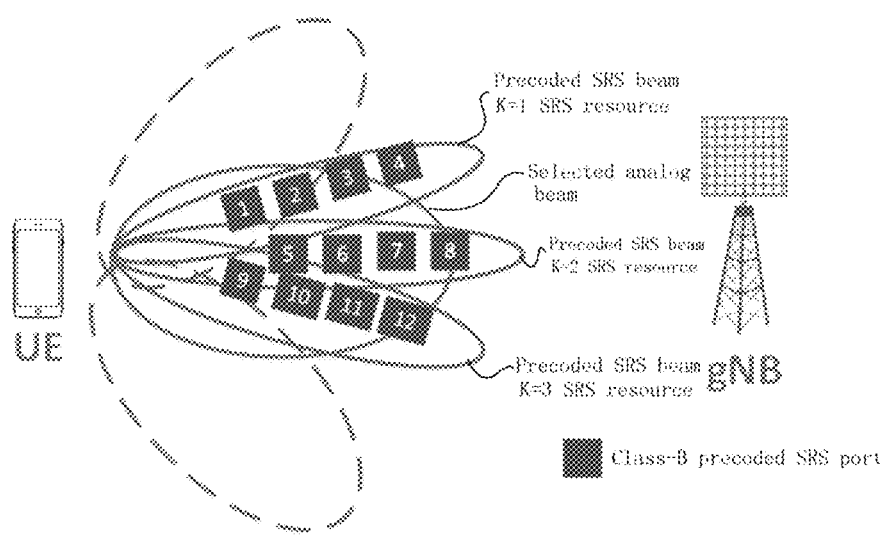

Next, as shown in FIG. 17B, the UE transmits K SRSs which are respectively precoded (for example, transmitting precoded SRS ports 1~4 on a first SRS resource, transmitting precoded SRS ports 5~8 on a second SRS resource, et cetera) by using K resources within the determined analog beam range, and the base station selects a precoding resource with the strongest receiving power by measuring the K SRS resources, for example, based on RSRP, and notifies the UE through an SRI, or the base station may directly feed back CQI to which each precoding SRS resource corresponds to the UE, for allowing the UE to make self-selection.

Figure 17C:
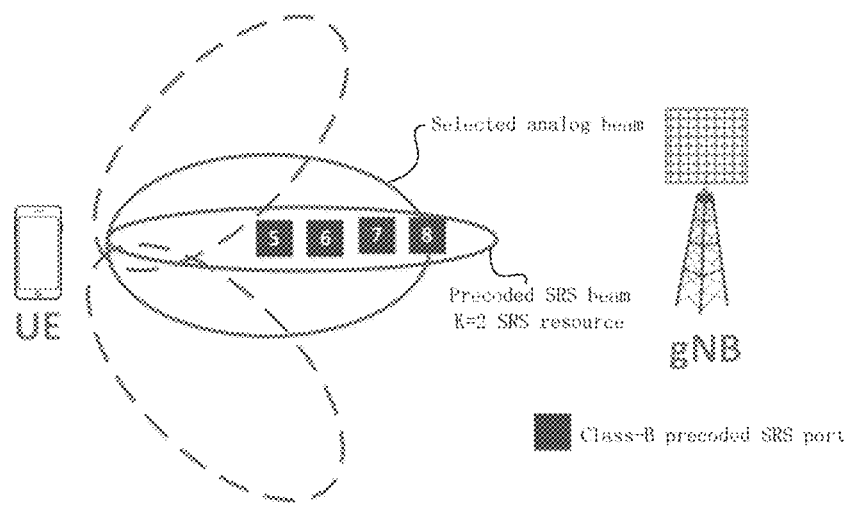

Next, as shown in FIG. 17C, the UE collects uplink CSI, for example including TPMI, TRI, by a precoding matrix to which the selected precoding resource corresponds.

Figure 17D:
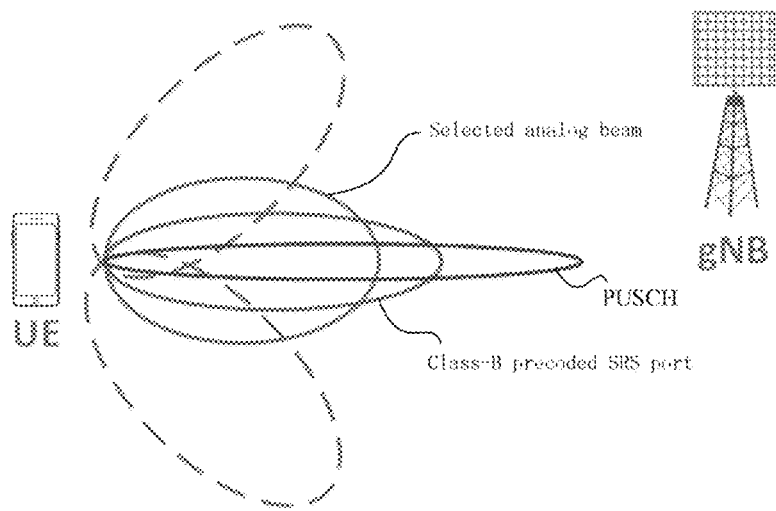

Finally, as shown in FIG. 17D, the UE determines, from the collected uplink CSI, a precoding matrix for data transmission so as to transmit uplink data on an uplink data channel PUSCH.

Figure 18:
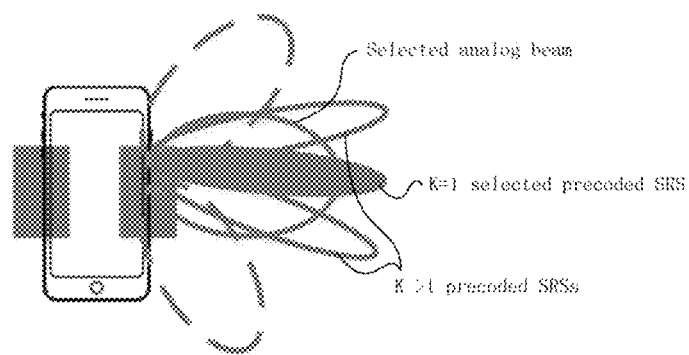
FIG. 18 is a schematic view for illustrating transmission of analog beams and digital precoding by a user equipment according to another exemplary embodiment.

Next, acquisition of uplink K>1 Class B CSI will be further illustrated with reference to FIG. 18.

Figure 19:
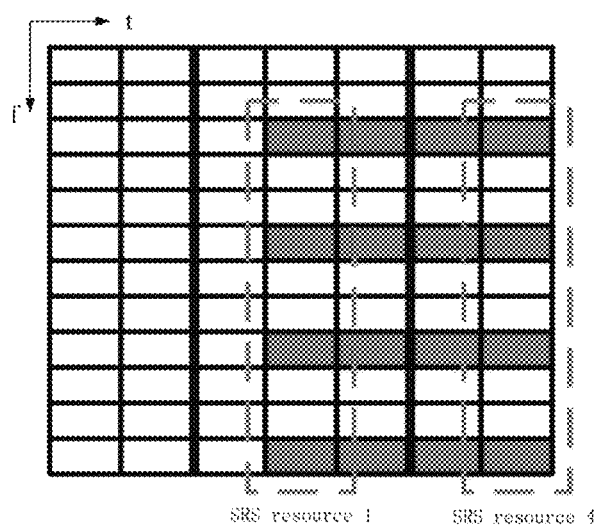
FIG. 19 is a schematic view for illustrating a condition of coexistence of K uplink reference signal resources in a physical resource block.

Upon determination of an uplink transmitting beam, the UE starts to transmit precoded Class B SRSs of K>1 resources on the beam. The number of the precoded SRS ports is generally smaller than the number of the TXRUs that the UE has. As an example, FIG. 19 shows a schematic view of coexistence of K SRS resources in a Physical Resource Block (PRB). In FIG. 19, the horizontal axis t represents time (i.e., OFDM symbol), and the vertical axis f represents frequency (i.e., subcarrier).

From the perspective of time, a transmission period for the K>1 Class B SRSs is relatively long, and its purpose is to allow the base station to know a general condition for an uplink channel of the UE, i.e., for which precoder a reference signal is more suitable for acquiring CSI.

After measuring the K>1 Class B SRSs, the base station may obtain RSRP of each SRS resource, and may function a precoder of an SRS carried by an SRS resource with the largest RSRP as a selected precoder, and may notify the UE through an SRI, for example. The UE recognizes a precoder indicated by the base station according to the SRI and performs precoding on the SRSs and performs denser transmission in comparison with the K>1 Class B SRSs, such that the base station performs measurement on the precoded SRSs and obtains uplink CSI.

As described previously, the base station may notify the UE of an uplink transmission beam through an SRI, and further, the base station may also notify the UE of alternative precoding through an SRI. Accordingly, the following exemplary manners may be adopted to distinguish uses of an SRI.

Manner 1: the base station may notify an SRS resource associated with an SRI to the UE in advance, and the base station may configure an SRS resource for the UE through high layer signaling such as RRC, for example, cause a part of the resource to be used only to perform uplink beam scanning and a part of the resource to be used only to perform transmission of an uplink precoded SRS, thereby making it possible to identify the purpose of an SRS resource corresponding to the SRI, i.e., whether the SRS resource is used for beam scanning or for uplink CSI acquisition.

Manner 2: the base station for example may use indication information in 1 bit together with an SRI to notify the UE of the use of the SRI. For example, bit "0" represents that an SRS resource indicated by the SRI is an SRS for beam scanning; bit "1" represents that an SRS resource indicated by the SRI is an SRS for CSI acquisition.

Accordingly, according to an embodiment, the reception control unit 113 may be configured to perform control to receive uplink reference signal resource notified by the base station, wherein in the uplink reference signal resource, a part of the resource can be used only for uplink beam scanning, and a part of the resource can be used only for transmitting an uplink reference signal.

In an embodiment, it is possible to determine, based on an indicator bit transmitted by the base station together with uplink reference signal resource indication, whether the uplink reference signal resource indication is directed to the resource for uplink beam scanning or the resource for transmitting an uplink reference signal.

Further, to expedite or exempt the process of uplink beam scanning, it is possible to perform communication through only a beam pair link determined in an initial access phase, and the UE may use a precoding SRS technique to substitute a fine beam pair link.

Accordingly, according to an embodiment, the transmission control unit 111 may be configured to perform control to transmit the first uplink reference signal through a beam pair link determined in an initial access phase.

Thereafter, it is possible to perform acquisition of uplink K=1 Class B CSI. The base station may measure the precoded K=1 Class B SRSs, and obtain a TPMI through calculation and notify it to the UE.

Figure 20:
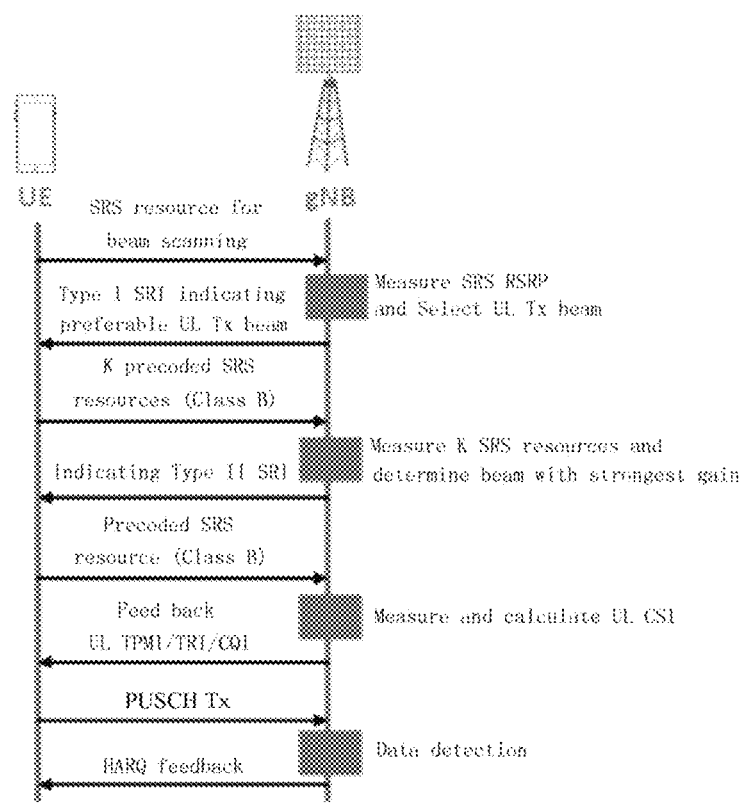
FIG. 20 shows a schematic view of signaling interaction for uplink hybrid channel state information according to another exemplary embodiment.

As an example, FIG. 20 shows an example of an acquisition process of channel state information. In comparison with the exemplary process as shown in FIG. 16, in the exemplary process as shown in FIG. 20, following the determined UL Tx beam, the UE transmits K precoded SRS resources, and the base station measures the K SRS resources, determines a beam with the strongest gain thereamong, and indicates a corresponding type II SRI to the UE.

Figure 7:
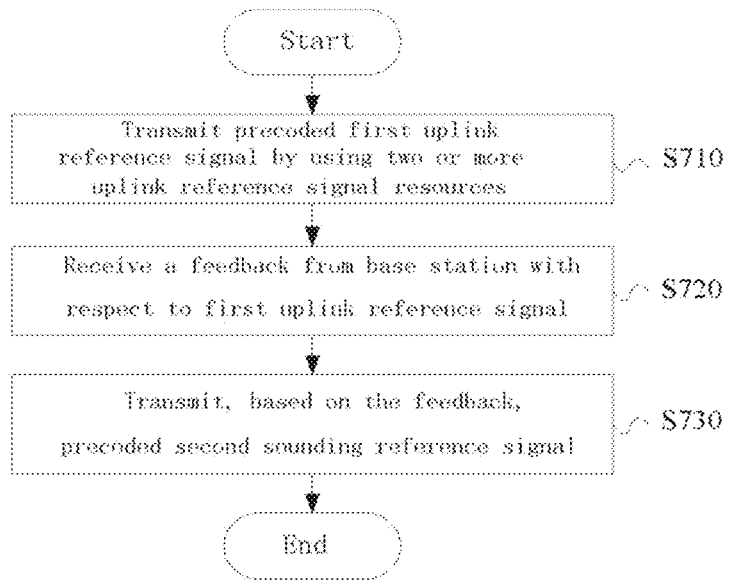
FIG. 7 is a flowchart showing a process example of a wireless communication method for user equipment side according to an embodiment of the present invention.

FIG. 7 shows a process example of a wireless communication method for user equipment side according to an embodiment for a second aspect of the present invention, and the method comprising the following steps:

S710 of transmitting a precoded first uplink reference signal by using two or more uplink reference signal resources;

S720 of receiving a feedback from a base station with respect to the first uplink reference signal; and S730 of transmitting, based on the feedback, a precoded second uplink reference signal.

Next, a configuration example of an electronic device for base station side according an embodiment for a second aspect of the present invention will be described still with reference to FIG. 4. An electronic device 400 according to the present embodiment comprises processing circuitry 410. The processing circuitry 410 comprises a reception control unit 411 and a transmission control unit 413.

The reception control unit 411 is configured to perform control to receive, from a user equipment, a precoded first uplink reference signal which is transmitted using two or more uplink reference signal resources.

The transmission control unit 413 is configured to perform control to transmit a feedback to the user equipment based on the first uplink reference signal.

The reception control unit 411 is further configured to perform control to receive a precoded second uplink reference signal which is transmitted by the user equipment based on the feedback.

Figure 8:
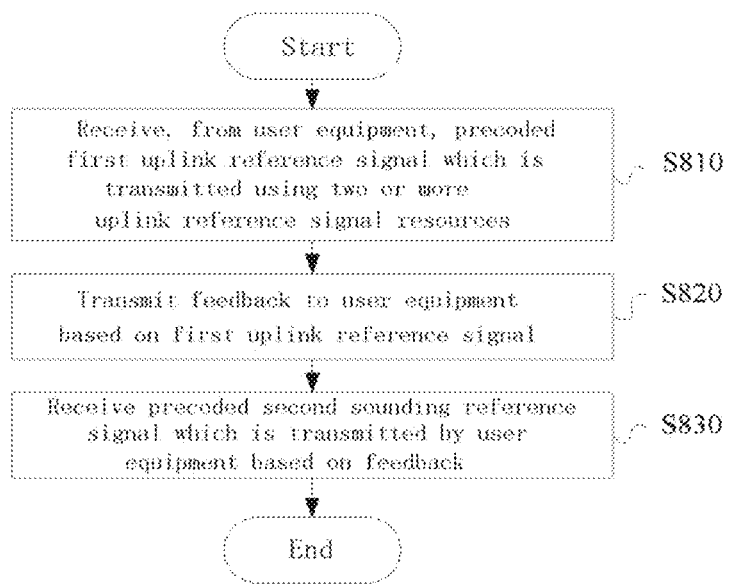
FIG. 8 is a flowchart showing a process example of a wireless communication method for base station side according to an embodiment of the present invention.

FIG. 8 shows a process example of a wireless communication method for base station side according to an embodiment for a second aspect of the present invention, the method comprising the following steps:

S810 of receiving, from a user equipment, a precoded first uplink reference signal which is transmitted using two or more uplink reference signal resources;

S820 of transmitting a feedback to the user equipment based on the first uplink reference signal; and S830 of receiving a precoded second uplink reference signal which is transmitted by the user equipment based on the feedback.

Figure 9:
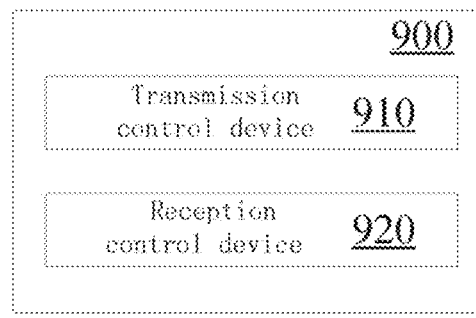
FIG. 9 is a flowchart showing a configuration example of a wireless communication apparatus for user equipment side according to an embodiment of the present invention.

As shown in FIG. 9, according to an embodiment, a wireless communication apparatus for user equipment side comprises: a transmission control device 910 configured to transmit a first uplink reference signal which is non-precoded; and a reception control device 920 configured to receive a feedback from a base station with respect to the first uplink reference signal; the transmission control device 910 further configured to transmit, based on the feedback, a second uplink reference signal which is precoded.

Referring still to FIG. 9, according to another embodiment, a wireless communication apparatus for user equipment side comprises: a transmission control device 910 configured to transmit a precoded first uplink reference signal by using two or more uplink reference signal resources; and a reception control device 920 configured to receive a feedback from a base station with respect to the first uplink reference signal; the transmission control device 910 is further configured to transmit, based on the feedback, a precoded second uplink reference signal.

Figure 10:
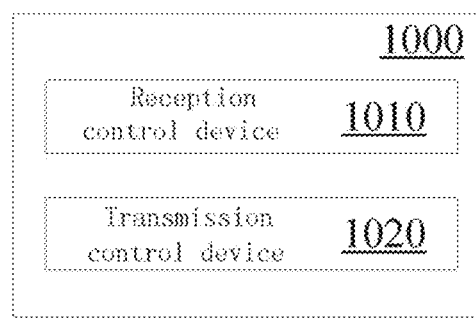
FIG. 10 is a block diagram showing a configuration example of a wireless communication apparatus for base station side according to an embodiment of the present invention.

As shown in FIG. 10, according to an embodiment, a wireless communication apparatus for base station side comprises: a reception control device 1010 configured to receive, from a user equipment, a first uplink reference signal which is non-precoded; a transmission control device 1020 configured to transmit a feedback to the user equipment based on the first uplink reference signal; the reception control device 1010 is further configured to receive, from the user equipment, a second uplink reference signal which is precoded and which is transmitted based on the feedback.

Referring still to FIG. 10, according to another embodiment, a wireless communication apparatus for base station side comprises: a reception control device 1010 configured to receive, from a user equipment, a precoded first uplink reference signal which is transmitted using two or more uplink reference signal resources; and a transmission control device 1020 configured to transmit a feedback to the user equipment based on the first uplink reference signal; the reception control device 1010 further configured to receive a precoded second uplink reference signal which is transmitted by the user equipment based on the feedback.

Further, embodiments of the present disclosure further comprise a computer-readable medium comprising executable instructions that, when executed by an information processing apparatus, cause the information processing apparatus to perform the methods according to the above-mentioned embodiments.

Figure 21:
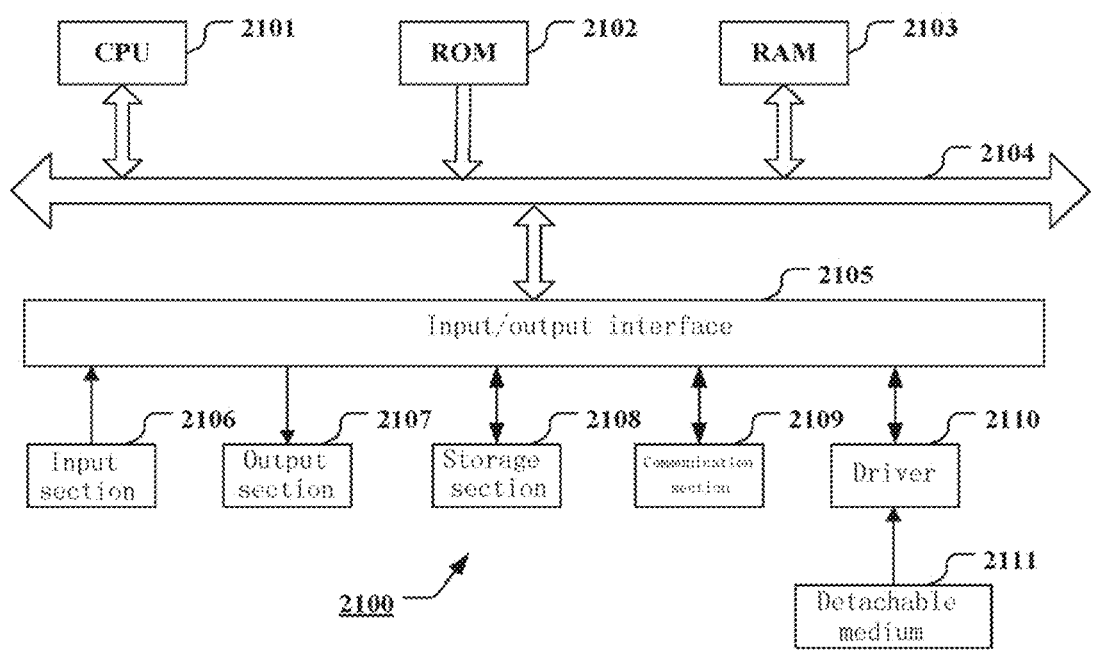
FIG. 21 is a block diagram showing an exemplary structure of a computer that realizes the methods and apparatus according to the present disclosure.

As an example, the respective steps of the above methods and the respective constituent modules and/or units of the above devices may be implemented as software, firmware, hardware or a combination thereof. In the case of implementation by software or firmware, a program constituting the software for implementing the above methods is installed from a storage medium or a network to a computer having a purpose-specific hardware structure (e.g., the universal personal computer 2000 as shown in FIG. 21). The computer, when installed with various programs, is capable of executing various functions and the like.

In FIG. 21, an central processing unit (i.e., CPU) 2101 executes various processing according to a program stored in a Read-Only Memory (ROM) 2102 or a program uploaded from a storage section 2108 to a Random Access Memory (RAM) 2103. In the RAM 2103, the required data when the CPU 2101 executes various processing and the like is also stored as needed. The CPU 2101, the ROM 2102 and the RAM 2103 are linked to each other via a bus 2104. An input/output interface 2105 is also linked to the bus 2104.

The following components are linked to the input/output interface 2105: an input section 2106 (including a keyboard, a mouse and the like), an output section 2107 (including a display, such as a Cathode Ray Tube (CRT), a Liquid Crystal Display (LCD) and the like, as well as a speaker and the like), the storage section 2108 (including a hard disc and the like), and a communication section 2109 (including a network interface card such as an LAN card, a modem and the like). The communication section 2109 executes communication processing via a network such as the Internet. As needed, a driver 2110 may also be linked to the input/output interface 2105. A detachable medium 2111 such as a magnetic disc, an optical disc, a magnetic optical disc, a semiconductor memory and the like is installed on the driver 2110 as needed, such that a computer program read therefrom is installed in the storage section 2108 as needed.

In a case where the above series of processing is implemented by software, a program constituting the software is installed from a network such as the Internet or a storage medium such as the detachable medium 2111.

Those skilled in the art should appreciate that such a storage medium is not limited to the detachable medium 2111 having stored therein a program and distributed separately from an apparatus to provide the program to a user as shown in FIG. 21. Examples of the detachable medium 2111 include a magnetic disc (including a floppy disc (registered trademark)), a compact disc (including a Compact Disc Read-Only Memory (CD-ROM) and a Digital Versatile Disc (DVD), a magneto optical disc (including a Mini Disc (MD) (registered trademark)), and a semiconductor memory. Alternatively, the storage medium may be hard discs and the like included in the ROM 2102 and the storage section 2108, in which programs are stored, and which are distributed concurrently with the apparatus including them to users.

Embodiments of the present invention further relate to a program product having stored therein machine-readable instruction codes that, when read and executed by a machine, can execute the above methods according to the embodiments of the present invention.

Accordingly, a storage medium for carrying the above program product having stored therein machine-readable instruction codes is also included in the disclosure of the present invention. The storage medium includes but is not limited to a floppy disc, an optical disc, a magnetic optical disc, a memory card, a memory stick and the like.

Embodiments of the present invention further relate to an electronic apparatus. The electronic apparatus, when used for base station side, may be realized as any type of Evolved node B (eNB), such as macro eNB and small eNB. The small eNB may be an eNB of a cell with smaller coverage than a macro cell, such as a pico eNB, a micro eNB and a home (femto) eNB. Alternatively, the electronic apparatus may be realized as any other type of base station, such as NodeB and Base Transceiver Station (BTS). Preferably, the electronic apparatus may be realized as a gNB in a 5G system. The electronic device may comprise: a main body (also referred to as a base station equipment) configured to control wireless communication; and one or more Remote Radio Heads (RRHs) arranged at different places of the main body. In addition, all the various types of terminals which will be described below can operate as base stations by temporarily or semi-persistently executing base station functions.

The electronic apparatus, when used for user equipment side, may be realized as a mobile terminal (such as an intelligent telephone, a tablet Personal Computer (PC), a notebook PC, a portable game terminal, a portable/softdog mobile router and a digital image pick-up device) or an in-vehicle terminal (such as an automobile navigation equipment). In addition, the electronic apparatus may be a wireless communication module (such as an integrated circuit module including a single or more wafers) installed on each of the above terminals.

[Application Example With Regard to Terminal Equipment]

Figure 22:
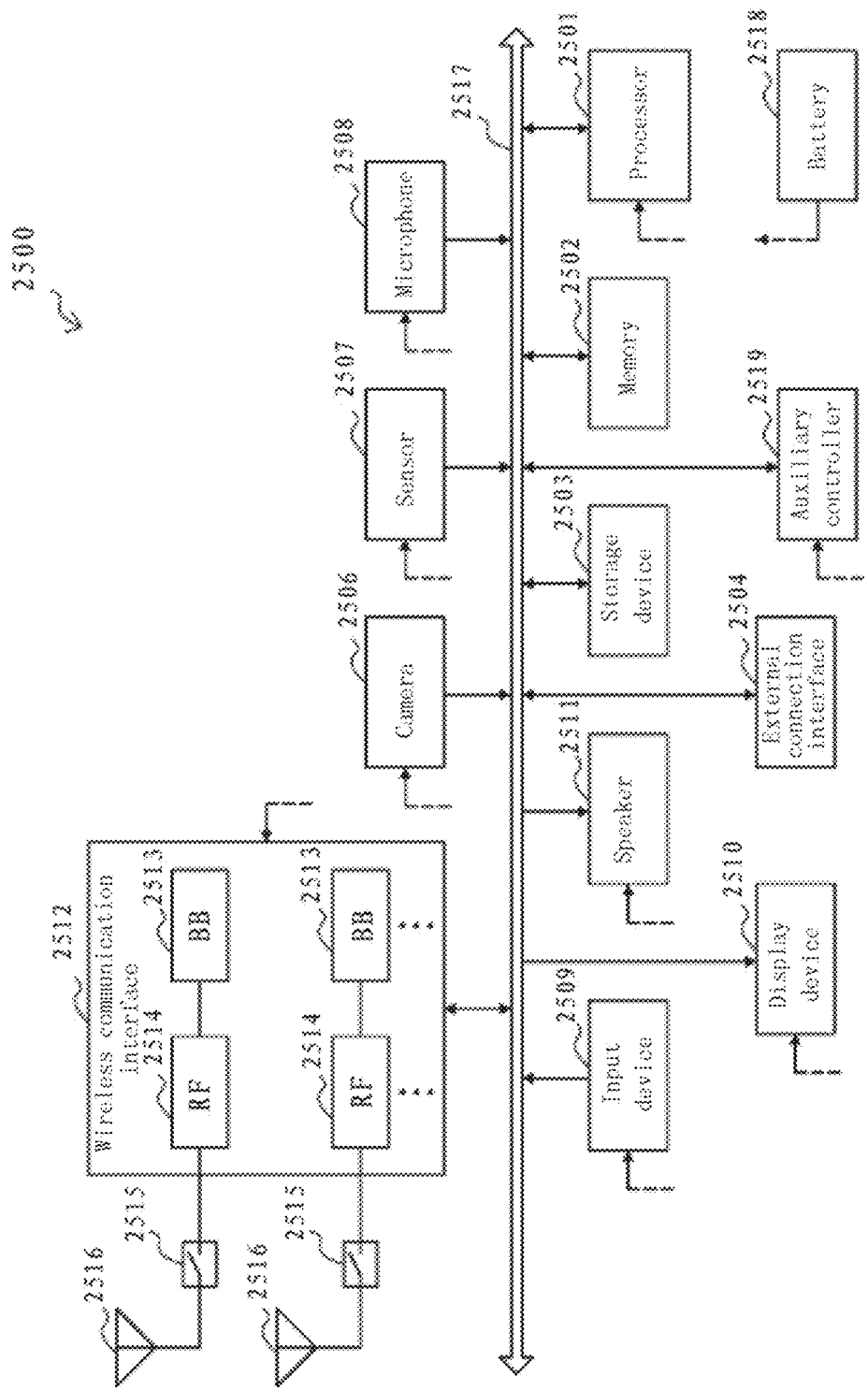
FIG. 22 is a block diagram showing an example of a schematic configuration of an intelligent telephone to which the technology of the present disclosure may be applied.

FIG. 22 is a block diagram showing an example of a schematic configuration of an intelligent telephone 2500 to which the technology of the present disclosure may be applied. The intelligent telephone 2500 comprises a processor 2501, a memory 2502, a storage device 2503, an external connection interface 2504, an camera 2506, a sensor 2507, a microphone 2508, an input device 2509, a display device 2510, a speaker 2511, a wireless communication interface 2512, one or more antenna switches 2515, one or more antennas 2516, a bus 2517, a battery 2518, and an auxiliary controller 2519.

The processor 2501 may be for example a CPU or a System on Chip (SoC), and control functions of an application layer and additional layers of the intelligent telephone 2500. The memory 2502 comprises an RAM and an ROM, and stores data and programs executed by the processor 2501. The storage device 2503 may comprise a storage medium, such as a semiconductor memory and a hard disc. The external connection interface 2504 is used for connecting an external device (such as a memory card and a Universal Serial Bus (USB) device) to an interface of the intelligent telephone 2500.

The camera 2506 comprises an image sensor (such as a Charge Coupled Device (CCD) and a Complementary Metal Oxide Semiconductor (CMOS)), and generates a captured image. The sensor 2507 may comprise a group of sensors, such as a measurement sensor, a gyro sensor, a geomagnetic sensor and an acceleration sensor. The microphone 2508 converts sound inputted to the intelligent telephone 2500 to an audio signal. The input device 2509 comprises for example a touch sensor configured to detect a touch on a screen of the display device 2510, a keypad, a keyboard, buttons or switches, and receives an operation or information inputted from a user. The display device 2510 comprises a screen (such as a Liquid Crystal Display (LCD) and an Organic Light-Emitting Diode (OLED) display), and displays an output image of the intelligent telephone 2500. The speaker 2511 converts the audio signal outputted from the intelligent telephone 2500 to sound.

The wireless communication interface 2512 supports any cellular communication scheme (such as LTE and LTE-Advanced), and executes wireless communication. The wireless communication interface 2512 generally may comprise for example a BB processor 2513 and an RF circuit 2514. The BB processor 2513 may execute for example coding/decoding, modulation/demodulation and multiplexing/demultiplexing, and execute various types of signal processing for wireless communication. Meanwhile, the RF circuit 2514 may comprise for example a frequency mixer, a filter and an amplifier, and transmit and receive a wireless signal via the antenna 2516. The wireless communication interface 2512 may be a chip module on which a BB processor 2513 and an RF circuit 2514 are integrated. As shown in FIG. 22, the wireless communication interface 2512 may comprise a plurality of BB processors 2513 and a plurality of RF circuits 2514. Although FIG. 22 shows an example in which the wireless communication interface 2512 comprises a plurality of BB processors 2513 and a plurality of RF circuits 2514, the wireless communication interface 2512 may also comprise a single BB processor 2513 or a single RF circuit 2514.

In addition, besides the cellular communication schemes, the wireless communication interface 2512 may support other types of wireless communication schemes, such as a short range wireless communication scheme, a near field communication scheme and a wireless Local Area Network (LAN) scheme. In this case, the wireless communication interface 2512 may comprise a BB processor 2513 and an RF circuit 2514 for each wireless communication scheme.

Each of the antenna switches 2515 switches a connection destination of the antenna 2516 between a plurality of circuits included in the wireless communication interface 2512 (for example, circuits for different wireless communication schemes).

Each of the antennas 2516 comprises a single or more antenna elements (such as a plurality of antenna elements included in an MIMO antenna), and is used for the communication interface 2512 to transmit and receive a wireless signal. As shown in FIG. 22, the intelligent telephone 2500 may comprise a plurality of antennas 2516. Although FIG. 22 shows an example in which the intelligent telephone 2500 comprises a plurality of antennas 2516, the intelligent telephone 2500 may also comprise a single antenna 2516.

In addition, the intelligent telephone 2500 may comprise an antenna 2516 for each wireless communication scheme. In this case, the antenna switch 2515 may be omitted from the configuration of the intelligent telephone 2500.

The bus 2517 connects the processor 2501, the memory 2502, the storage device 2503, the external connection interface 2504, the camera 2506, the sensor 2507, the microphone 2508, the input device 2509, the display device 2510, the speaker 2511, the wireless communication interface 2512 and the auxiliary controller 2519 to each other. The battery 2518 supplies electric power to the respective blocks of the intelligent telephone 2500 as shown in FIG. 22 via feeder lines which are partially shown as dashed lines in the figure. The auxiliary controller 2519 for example manipulates the minimum necessary function of the intelligent telephone 2500 in a sleep mode.

In the intelligent telephone 2500 as shown in FIG. 22, the transceiver device of the wireless communication apparatus at user equipment side according to the embodiment of the present invention may be realized by the wireless communication interface 2512. At least part of the functions of the processing circuitry and/or respective units of the electronic device or wireless communication apparatus at user equipment side according to the embodiment of the present invention may also be implemented by the processor 2501 or the auxiliary controller 2519. For example, part of the function of the processor 2501 may be implemented by the auxiliary controller 2519 so as to reduce power consumption of the battery 2518. Further, the processor 2501 or the auxiliary controller 2519 may implement part of the functions of the processing circuitry and/or respective units of the electronic device or wireless communication apparatus at user equipment side according to the embodiment of the present invention by executing the program stored in the memory 2502 or the storage device 2503.

[Application Example With Regard to Base Station]

Figure 23:
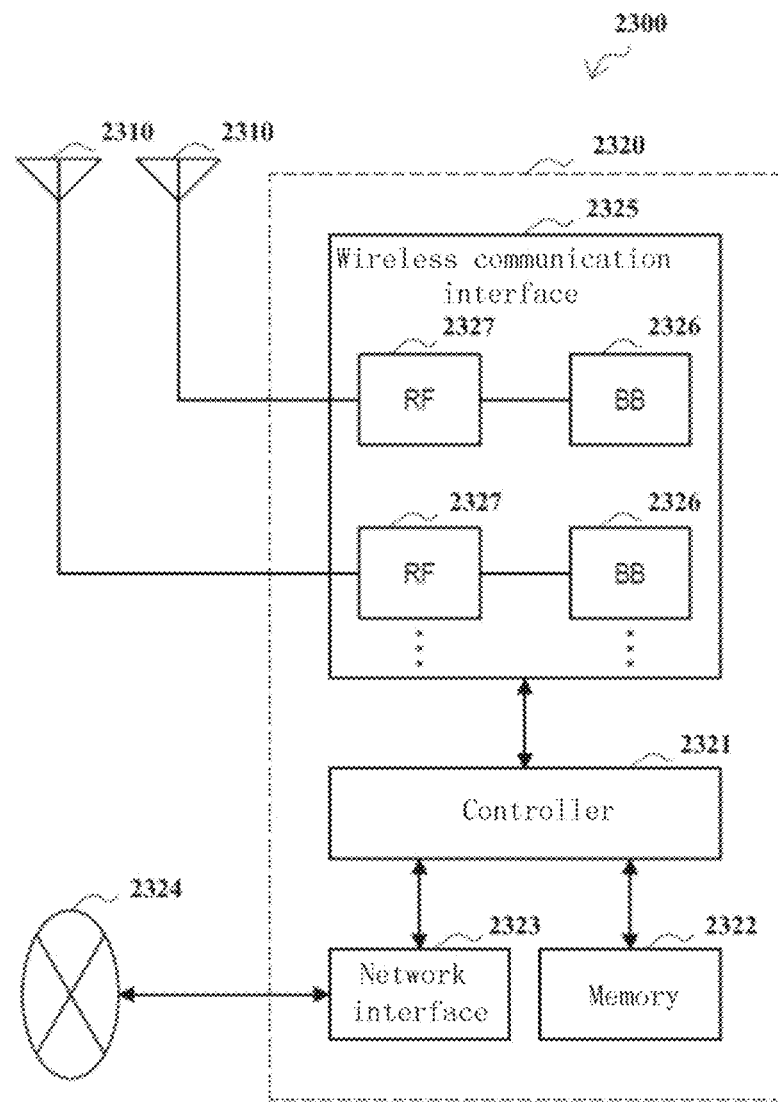
FIG. 23 is a block diagram showing an example of a schematic configuration of gNB (a base station in a 5G system) to which the technology of the present disclosure may be applied.

FIG. 23 is a block diagram showing an example of a schematic configuration of a gNB to which the technology of the present disclosure may be applied. The gNB 2300 comprises one or more antennas 2310 and a base station equipment 2320. The base station equipment 2320 and each antenna 2310 may be connected with each other via a radio frequency (RF) cable.

Each of the antennas 2310 comprises a single or more antenna elements (such as a plurality of antenna elements included in a Multi-Input Multi-Output (MIMO) antenna), and is used for the base station equipment 2320 to transmit and receive a wireless signal. As shown in FIG. 23, the gNB 2300 may comprise a plurality of antennas 2310. For example, the plurality of antennas 2310 may be compatible with a plurality of frequency bands used by the gNB 2300.

The base station equipment 2320 comprises a controller 2321, a memory 2322, a network interface 2323, and a wireless communication interface 2325.

The controller 2321 may be for example a CPU or a DSP, and manipulates various functions of a higher layer of the base station equipment 2320. For example, the controller 2321 generates data packets according to data in a signal processed by the wireless communication interface 2325, and transfers the generated packets via the network interface 2323. The controller 2321 may perform bundling for data from a plurality of baseband processors to generate bundled packets, and transfer the generated bundled packets. The controller 2321 may have a logic function of executing control, which is such as radio resource control, radio bearer control, mobility management, admission rule and dispatching. The control may be executed in combination with a nearby gNB or a core network node. The memory 2322 comprises an RAM and an ROM, and stores programs executed by the controller 2321 and various types of control data (such as a terminal list, transmission power data, and scheduling data).

The network interface 2323 is a communication interface for connecting the base station equipment 2320 to a core network 2324. The controller 2321 may communicate with a core network node or another gNB via the network interface 2323. In this case, the gNB 2300 and the core network node or another gNB may be connected to each other via a logic interface (such as NG interface and Xn interface). The network interface 2323 may also be a wired communication interface, or a wireless communication interface for a wireless backhaul. If the network interface 2323 is a wired communication interface, as compared with frequency bands used by the wireless communication interface 2325, the network interface 2323 may use higher frequency bands for wireless communication.

The wireless communication interface 2325 supports any cellular communication scheme (such as Long Term Evolution (LTE) and LTE-Advanced), and is provided with a wireless connection to a terminal located in a cell of the gNB 2300 via the antenna 2310. The wireless communication interface 2325 generally may comprise for example a Base-Band (BB) processor 2326 and an RF circuit 2327. The BB processor 2326 may execute for example coding/decoding, modulation/demodulation and multiplexing/demultiplexing, and execute various types of signal processing of layers (for example L1, Medium Access control (MAC), Radio Link Control (RLC) and Packet Data Convergence Protocol (PDCP)). Instead of the controller 2321, the BB processor 2326 may have part of all of the above logic function. The BB processor 2326 may be a memory which stores a communication control program, or a module comprising a processor configured to execute a program and a related circuit. The function of the BB processor 2326 may be changed through program updating. The module may be a card or blade inserted in a slot of the base station equipment 2320. Alternatively, the module may also be a chip installed on a card or blade. Meanwhile, the RF circuit 2327 may comprise for example a frequency mixer, a filter and an amplifier, and transmit and receive a wireless signal via the antenna 2310.

As shown in FIG. 23, the wireless communication interface 2325 may comprise a plurality of BB processors 2326. For example, the plurality of BB processors 2326 may be compatible with a plurality of frequency bands used by the gNB 2300. As shown in FIG. 23, the wireless communication interface 2325 may comprise a plurality of RF circuits 2327. For example, the plurality of RF circuits 2327 may be compatible with a plurality of antenna elements. Although FIG. 23 shows an example in which the wireless communication interface 2325 comprises a plurality of BB processors 2326 and a plurality of RF circuits 2327, the wireless communication interface 2325 may also comprise a single BB processor 2326 or a single RF circuit 2327.

In the gNB 2300 as shown in FIG. 23, the transceiver device of the wireless communication apparatus at base station side according to the embodiment of the present invention may be realized by the wireless communication interface 2325. At least part of the functions of the processing circuitry and/or respective units of the electronic device or wireless communication apparatus at base station side according to the embodiment of the present invention may also be implemented by the controller 2321. For example, the controller 2321 may implement at least part of the functions of the processing circuitry and/or respective units of the electronic device or wireless communication apparatus at base station side according to the embodiment of the present invention by executing a program stored in the memory 2322.

In the foregoing description of the detailed embodiments of the present invention, features described and/or shown with respect to one embodiment may be used in one or more other embodiments in an identical or similar manner, be combined with features in other embodiments, or substitute features in other embodiments.

It should be emphasized that, the term "comprise/include" used herein refers to existence of features, elements, steps or assemblies, but does not preclude existence or addition of one or more other features, elements, steps or assemblies.

In the above embodiments and examples, reference numerals composed of digits are used to represent the respective steps and/or units. Those ordinarily skilled in the art should understand that, these reference numerals aim only to facilitate description and plotting, but do not represent an order thereof or any other limitation.

Further, the methods of the present invention are not limited to be executed in the temporal order described in the specification, but may also be executed sequentially, in parallel or independently in other orders. Therefore, the execution order of the methods described in the present specification does not constitute a limitation to the technical scope of the present invention.

Although the present invention has been disclosed above by the description of the detailed embodiments of the present invention, it should be understood that all the above embodiments and examples are exemplary but not imitating. Those skilled in the art could design various modifications, improvements or equivalents with regard to the present invention within the spirit and scope of the appended claims. These modifications, improvements or equivalents should also be construed as being included within the scope of protection of the present invention.

The invention claimed is:

1. An electronic device for a base station, the electronic device comprising processing circuitry configured to perform control to:
   receive, from a user equipment, a precoded first uplink reference signal which is transmitted using two or more uplink reference signal resources;
   transmit a feedback to the user equipment based on the first uplink reference signal; and
   receive a precoded second uplink reference signal which is transmitted by the user equipment based on the feedback,
   wherein the processing circuitry is configured to perform control to receive the first uplink reference signal with a first period, and to receive the second uplink reference signal with a second period shorter than the first period.

2. The electronic device according to claim 1, wherein the processing circuitry is further configured to perform reception of the first uplink reference signal on a beam determined through a beam scanning.

3. The electronic device according to claim 1, wherein the processing circuitry is configured to perform control to perform reception of the first uplink reference signal on a beam determined in an initial access phase.

4. The electronic device according to claim 1, wherein the feedback includes a precoding matrix indication determined by the base station based on the first uplink reference signal.

5. The electronic device according to claim 1, wherein the processing circuitry is further configured to perform control to transmit uplink channel state information determined by the base station based on the second uplink reference signal.

6. The electronic device according to claim 5, wherein the uplink channel state information includes an uplink precoding matrix index and a rank index.

7. A non-transitory computer readable medium comprising computer readable instructions which, when executed, cause a computer to:
   receive, from a user equipment, a precoded first uplink reference signal which is transmitted using two or more uplink reference signal resources;
   transmit a feedback to the user equipment based on the first uplink reference signal; and
   receive a precoded second uplink reference signal which is transmitted by the user equipment based on the feedback,
   wherein the first uplink reference signal is received with a first period, and the second uplink reference signal is received with a second period shorter than the first period.

8. A method for communications by a base station comprising the steps of:
   receiving, from a user equipment, a precoded first uplink reference signal which is transmitted using two or more uplink reference signal resources;
   transmitting a feedback to the user equipment based on the first uplink reference signal; and
   receiving a precoded second uplink reference signal which is transmitted by the user equipment based on the feedback,
   wherein the first uplink reference signal is received with a first period, and the second uplink reference signal is received with a second period shorter than the first period.

9. The method of claim 8, further comprising:
performing reception of the first uplink reference signal on a beam determined through a beam scanning.

10. The method of claim 8, further comprising:
performing reception of the first uplink reference signal on a beam determined in an initial access phase.

11. The method of claim 8, wherein the feedback includes a precoding matrix indication determined by the base station based on the first uplink reference signal.

12. The method of claim 8, further comprising:
transmitting uplink channel state information determined by the base station based on the second uplink reference signal.

13. The method of claim 12, wherein the uplink channel state information includes an uplink precoding matrix index and a rank index.

* * * * *